US006437547B2

(12) United States Patent
Petricek et al.

(10) Patent No.: US 6,437,547 B2
(45) Date of Patent: *Aug. 20, 2002

(54) BOARD MOUNTABLE POWER SUPPLY MODULE WITH MULTI-FUNCTION CONTROL PIN

(75) Inventors: Shea L. Petricek; James Carroll Wadlington, both of Austin, TX (US)

(73) Assignee: Tyco Electronics Logistics AG, Steinach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/756,034

(22) Filed: Jan. 6, 2001

Related U.S. Application Data

(63) Continuation of application No. 09/383,693, filed on Aug. 26, 1999, now Pat. No. 6,191,566.

(51) Int. Cl.[7] .............................................. G05F 1/40
(52) U.S. Cl. .................... 323/272; 323/224; 323/351
(58) Field of Search ................................ 323/222, 223, 323/224, 225, 268, 271, 272, 283, 284, 285, 282, 259, 265, 290; 307/86, 87, 44

(56) References Cited

U.S. PATENT DOCUMENTS

| | | | |
|---|---|---|---|
| 3,824,450 A | | 7/1974 | Johnson et al. ................ 323/23 |
| 4,924,170 A | | 5/1990 | Henze ......................... 323/272 |
| 5,617,306 A | * | 4/1997 | Lai et al. ....................... 363/17 |
| 5,638,264 A | | 6/1997 | Hayashi et al. ................ 363/65 |
| 5,838,151 A | | 11/1998 | Myers et al. ................ 323/353 |
| 5,864,476 A | | 1/1999 | Busch ........................... 363/69 |
| 6,005,773 A | * | 12/1999 | Rozman et al. .............. 361/707 |
| 6,009,000 A | * | 12/1999 | Siri ............................... 363/21 |
| 6,191,566 B1 | * | 2/2001 | Petricek et al. .............. 323/224 |

FOREIGN PATENT DOCUMENTS

| | | | |
|---|---|---|---|
| EP | 0 765 021 A1 | 3/1997 | ............. H02J/7/14 |
| WO | WO 92/03773 | 5/1992 | |

OTHER PUBLICATIONS

"New Power Processor Interfaces MMS Power Module Outputs" by P.R.K. Chetty; 1987 IEEE; pp. 311–316, No Month.

* cited by examiner

*Primary Examiner*—Peter S. Wong
*Assistant Examiner*—Gary L. Laxton

(57) ABSTRACT

A board mountable power supply module is described. The power supply module includes a power train for converting an input voltage into a regulated output voltage and a controller operable to control the power train. The power train is connected to the input and output voltages through an input voltage pin, an output voltage pin and a common pin. The controller includes a multifunction control pin, which allows for disabling the power supply module and for trimming the output voltage. Additionally, two or more power supply modules can be connected in parallel to form a power supply that is capable of meeting increased load current requirements. Each of the multifunction control pins in the power supply is electrically connected together to improve current sharing between modules by reducing internal variances between modules.

11 Claims, 5 Drawing Sheets

BOARD MOUNTABLE POWER SUPPLY MODULE WITH MULTI-FUNCTION CONTROL PIN

This application is a continuation of U.S. Ser. No. 09/383,693, filed Aug. 26, 1999, now U.S. Pat. No. 6,191,566.

TECHNICAL FIELD OF THE INVENTION

The present invention relates to power converters. Specifically, the present invention is a board mountable power supply having a multi-function control pin.

BACKGROUND OF THE INVENTION

More and more electronic applications are requiring distributed power architectures where the current requirements of the electrical loads are requiring the power supplies to be moved as close to the load as practicable. Instead of the single power supply which would accept ac line voltage and produce a dc or ac output voltage for use by an entire electrical system, today's ultra fast electronics and electrical components require their own power supply to accommodate the high transients in their load currents. This new concept in power systems is often referred to as a "distributed power architecture." This type of power architecture can be implemented by means of a system rectifier that converts the ac line current into an unregulated or slightly regulated dc voltage, and numerous "point-of-load" power supplies. The point-of-load power supplies accept the dc voltage from the rectifier and produce a highly regulated dc voltage which is able to accommodate very large current transients (large di/dt).

The point-of-load power supplies need to be small, have a high power density, and be mountable on the circuit boards near the load. In addition, the point-of-load power supplies should be modular to allow two or more to be connected in parallel to supply power to high current loads, or to provide redundancy. This modularity allows a single design to be adapted for loads with varying current requirements. These small modular power supplies, however, present numerous design issues. Their high power density and small size, force pin footprints to be minimized, and when placed in parallel they must be forced to share current effectively.

The small size and high power density requirement forces the power modules to sacrifice features both due to lack of space on the circuit board as well as to minimize the number of pins, as well the pin footprints, so that the modules take up as little space as possible on the system board to which they will be mounted. Further, small variances in component values or reference levels will cause one or two paralleled power supplies to supply the majority of load current while some of the remaining modules supply relatively little, or no, current. This disparity in load currents causes the modules supplying the majority of the current to wear faster due to the increased thermal stresses, leading to premature failures in the field.

Accordingly, what is needed is a power supply module that minimizes the pin footprint and shares current effectively when placed in parallel with other power supply modules.

SUMMARY OF THE INVENTION

The present invention provides a power supply module with a multifunction control pin which allows the module to be disabled, the output voltage to be trimmed and the current between parallel modules to be shared more equally. The power supply module of the present invention is formed by a power train and a controller. The power train accepts an input voltage and produces a regulated output voltage capable of powering a load. The power train includes an input voltage pin, an output voltage pin and a common pin for connecting between the input voltage and the load. The controller is connected to the power train and operates to control the power train to maintain the output voltage at its regulated level despite changes in the input voltage or load current requirements. The controller includes the multifunction control pin as well as an internal reference voltage which is used to set the output voltage.

The multifunction control pin allows the output voltage to be trimmed by allowing the reference voltage used by the controller to be adjusted up or down. The multifunction control pin is capable of disabling the power supply module by either reducing the reference voltage to zero, or by disabling an internal integrated circuit in the controller itself. Additionally, the multifunction control pin can provide for improved current sharing between paralleled power supply modules. Since differences in the internal reference voltages between power supply modules is a major source of current sharing deficiencies, interconnecting the multifunction control pin of each of the parallel power supply modules sets the reference voltage in each module to the same value and allows the parallel power modules to share current much more equally.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE DRAWINGS

Figure 1:
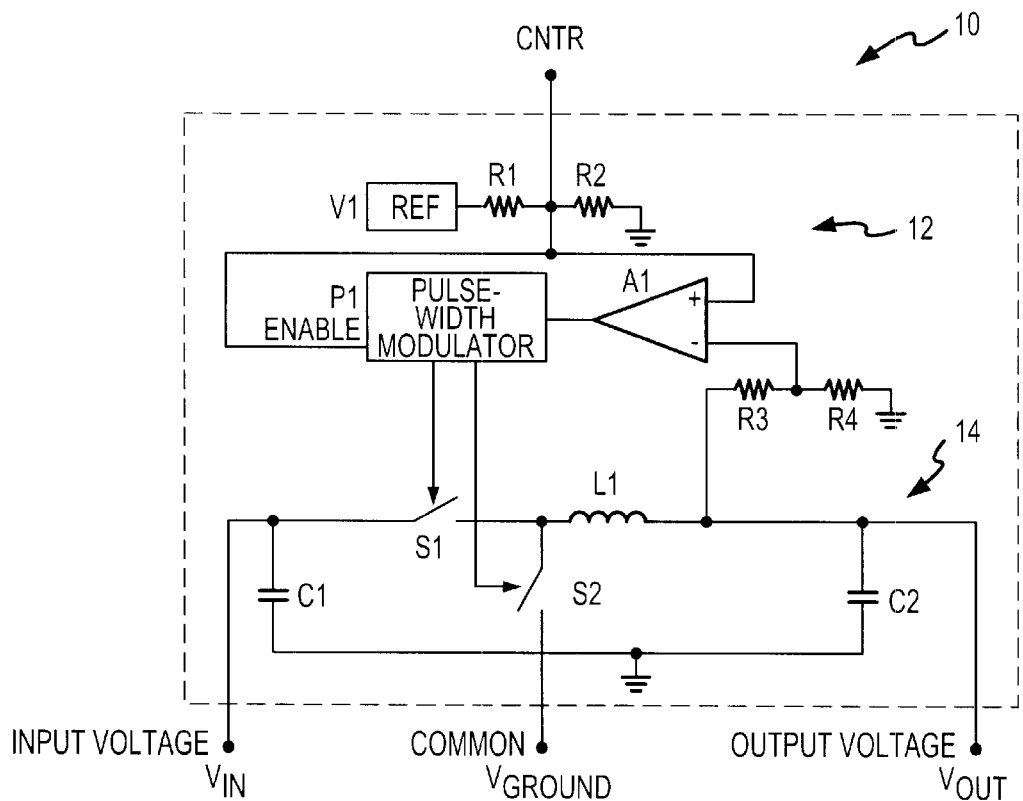
FIG. 1 is a circuit diagram of a power supply module according to the principles of the present invention.

Referring now to FIG. 1, a circuit diagram of a board mountable power module 10, which incorporates the features of the present invention, is shown. Power module 10 is formed by power train 14, which is a dc to dc converter that acts to convert an input voltage into a well regulated output voltage, and controller 12, which acts to control power train 14. Power module 10 includes pinouts for input voltage pin $V_{in}$, output voltage pin $V_{out}$, common pin $V_{ground}$ and multi-function control pin CNTR.

Power converter 14 uses switches S1 and S2 to convert the unregulated, or slightly regulated, dc input voltage on input voltage pin $V_{in}$, into a well regulated dc output voltage supplied to the load on output voltage pin $V_{out}$. Switch S1 operates at a duty cycle D determined by controller 12 based on the sensed output voltage. Switch S2 is operated at a duty cycle of 1-D and completely out of phase with switch S1, such that one and only one switch is on at any particular moment. Inductor L1 and capacitor C2 form an averaging filter that smoothes the square wave output from switches S1 and S2. Capacitor C1 acts to remove any ac component from the input voltage.

As stated, power train 14, illustrated in FIG. 1, operates to convert the input voltage on input voltage pin $V_{in}$, to a well-regulated output voltage on output voltage pin $V_{out}$ by alternately opening and closing switches S1 and S2. When switch S1 is closed, current flows directly to the load and inductor L1 is charged. When switch S1 is open and switch S2 is closed, inductor L1 discharges, supplying current to the load and back through the loop formed by closed switch S2. Power to the load is controlled by varying the duty cycle of switches S1 and S2.

While power train 14, shown in FIG. 1, is shown as a standard buck, switch-mode power converter, those skilled in the art will readily understand that the buck converter shown in FIG. 1 is for illustrative purposes only and could be any isolated or non-isolated switch-mode power converter.

Controller 12 regulates power train 14 by operating switches S1 and S2 according to the sensed output voltage. Pulse width modulator P1 has outputs which act to open and close switches S1 and S2 at a particular frequency. As stated, the duty cycle of the switches depend on the sensed output voltage $V_{sense}$ which is fed to error amplifier A1 from a voltage divider made up of resistors R3 and R4. The sensed output voltage $V_{sense}$ is compared with a reference voltage $V_{ref}$ generated by reference voltage generator V1. Reference voltage $V_{ref}$ is determined from the voltage divider formed by R1 and R2 and fed to error amplifier A1. Error amplifier A1 generates an error signal based on the difference between the sensed output voltage $V_{sense}$ and the reference voltage $V_{ref}$ and that signal is used by pulse width modulator P1 to set the duty cycle of switches S1 and S2.

Controller 12 includes multifunction control pin CNTR, which is connected to $V_{ref}$ as well as to the enable pin of pulse width modulator P1. As will be discussed in greater detail with reference to FIGS. 2 and 4, multifunction control pin CNTR allows the output voltage to be trimmed, the power module to be disabled, and allows for current sharing between parallel modules.

Figure 2:
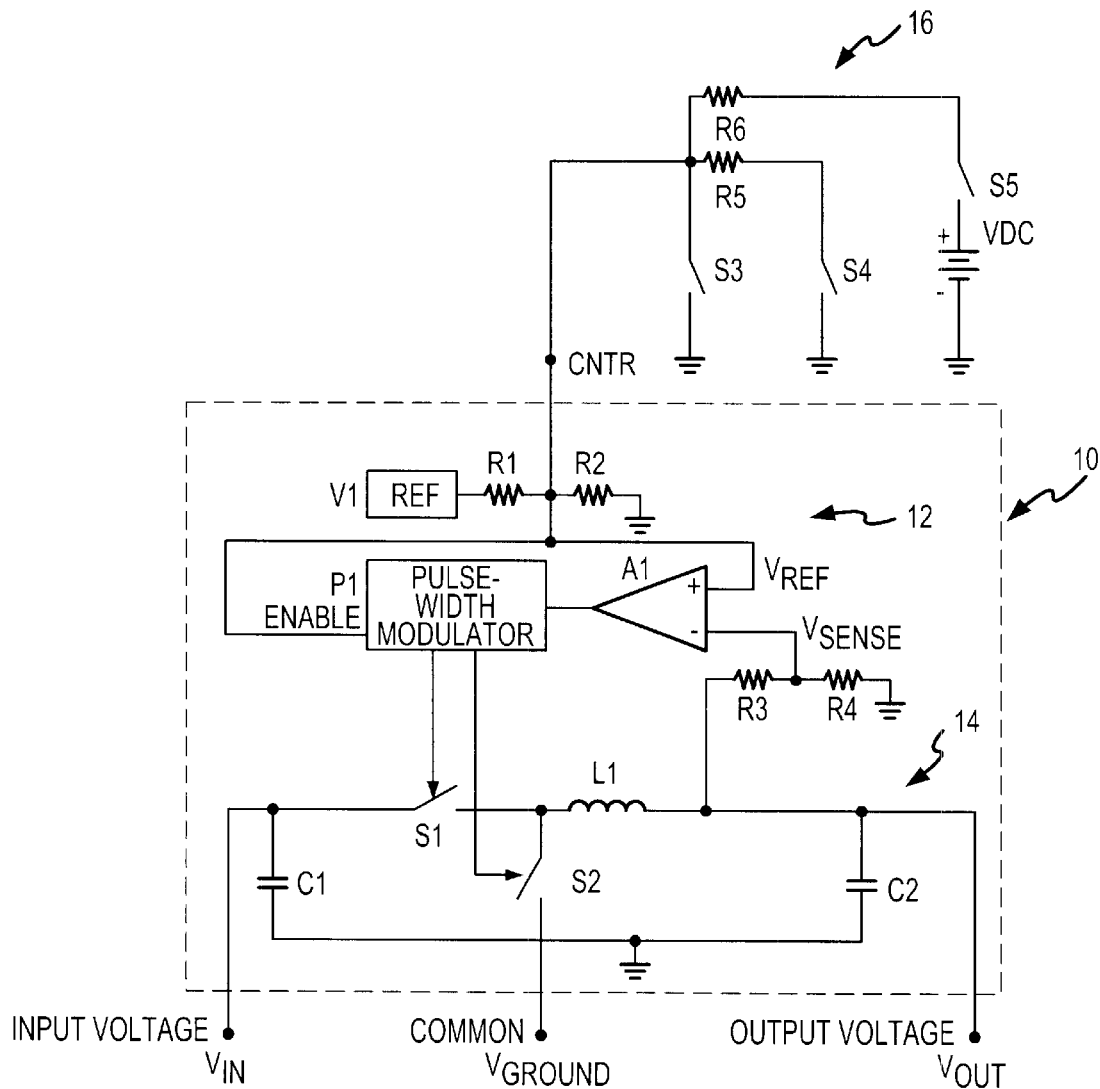
FIG. 2 is a circuit diagram of the power supply module of FIG. 1 with external control circuitry connected to the multi-function control pin.

Referring now to FIG. 2, power module 10 of FIG. 1 is shown with external circuitry 16 connected to multifunction control pin CNTR. Multifunction control pin CNTR is shown connected to resistor R6, which is connected in series with switch S5 and-dc voltage source $V_{dc}$. Multifunction control pin CNTR is also connected to switch S3 and resistor R5, which is in series with switch S4. External circuitry 16 can be used to trim the output voltage of power module 10 or to disable power module 10, such that it does not produce an output voltage.

The output voltage of power module 10 is trimmed, or adjusted, by opening and closing switches S4 or S5. Closing switch S4 places resistor R5 in parallel with resistor R2. This effectively changes the value of the voltage divider originally formed by R1 and R2, which is now formed by R1 and the parallel combination of R2 and R5. The parallel combination of R2 and R5 lowers reference voltage $V_{ref}$, thereby lowering the output voltage in the same proportion by which $V_{ref}$ was lowered. Conversely, when switch S4 is open and switch S5 is closed, dc voltage source $V_{dc}$ injects current through resistor R6 into the voltage divider formed by R1 and R2. This effectively raises reference voltage $V_{ref}$, thereby raising the output voltage in the same proportion as the reference voltage $V_{ref}$. The amount of adjustment obtained by external circuitry 16 is determined by the values of R5 and R6.

Switch S3 allows power module 10 to be enabled and disabled. Power module 10 is enabled and works as described above when switch S3 is open. When closed switch S3 pulls $V_{ref}$ to ground. This should be enough to bring the output voltage to zero, but since switch S3 has some series resistance $V_{ref}$ will always be non-zero resulting in some output voltage. This is overcome by connecting $V_{ref}$ to the enable pin of pulse width modulator P1. Most pulse width modulated "PWM" controllers have a mechanism by which they can be turned off by driving a particular pin voltage low and this is illustrated by the enable pin shown on pulse width modulator P1. Now when switch S3 is closed the enable pin is grounded and pulse width modulator P1 is disabled, effectively shutting down power module 10.

Figure 3:
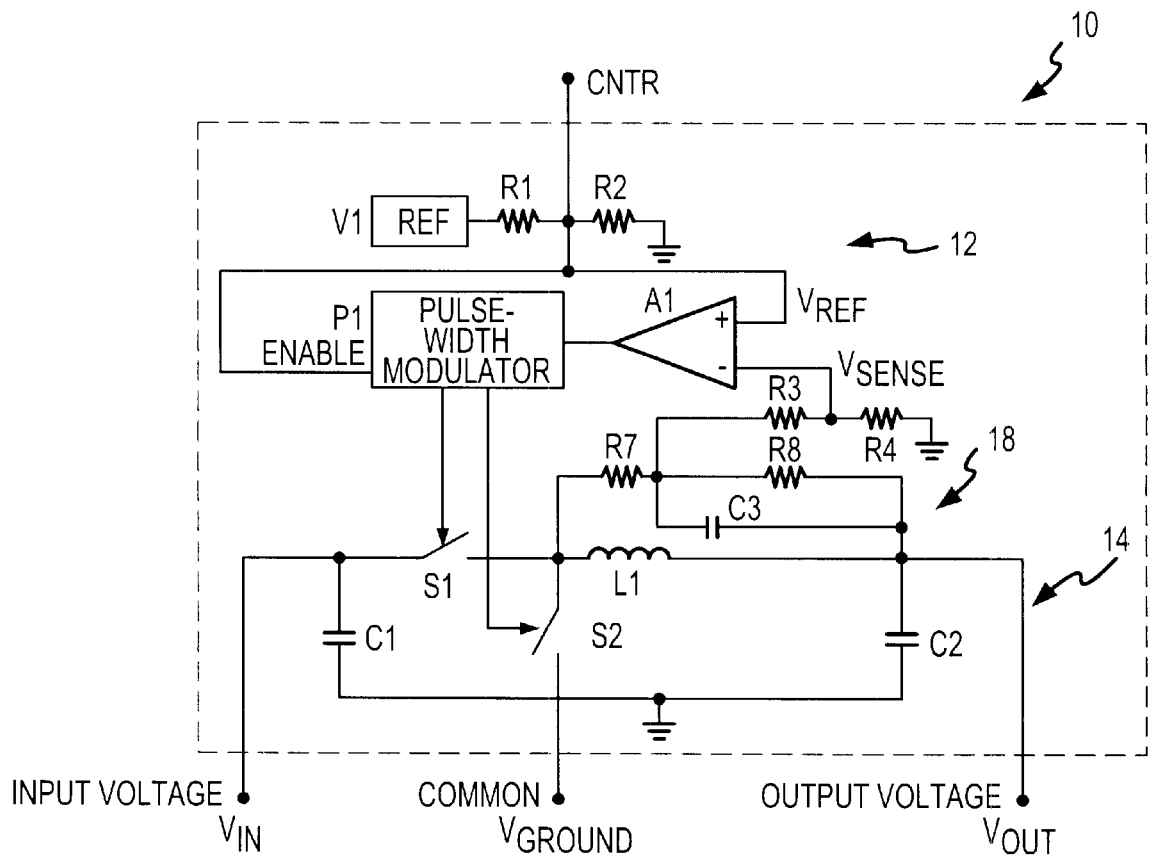
FIG. 3 is a circuit diagram of an alternative embodiment of a power module according to the present invention.

Referring now to FIG. 3, an alternate embodiment of power module 10 is shown which incorporates an output voltage droop characteristic introduced to help parallel modules current share, as will be discussed in greater detail below. Integrator network 18 is added to the output voltage sensing portion of controller 12. Integrator network 18 works with the inherent internal resistance of inductor L1. Because of this inherent internal resistance, inductor L1 has a small voltage drop across it proportional to the current through inductor L1.

Integrator network 18 is formed by resistors R7 and R8 and capacitor C3 which form an integrator that detects a portion of the voltage across inductor L1. This results in a voltage across capacitor C3 that is proportional to the current through inductor L1. Instead of only sensing the output voltage, the sensed voltage $V_{sense}$ is now proportional to the output voltage plus the voltage across C3. Error amplifier A1 therefore sees an output voltage that increases with the current in inductor L1 as compared with reference voltage $V_{ref}$. Since the voltage across capacitor C3 increases with increased current in inductor L1, sensed voltage $V_{sense}$ also increases. Error amplifier A1 sends a corresponding error signal to pulse width modulator P1 which results in controller 12 acting to reduce the output voltage as current through inductor L1 increases, thereby forming an output voltage droop characteristic. Although integrator network 18 is described in detail, one skilled in the art will easily understand that any network that develops a voltage proportional to the current through inductor L1, for example a single resistor, would act as an integrator network 18 and would be well within the scope of the present invention.

Figure 4:
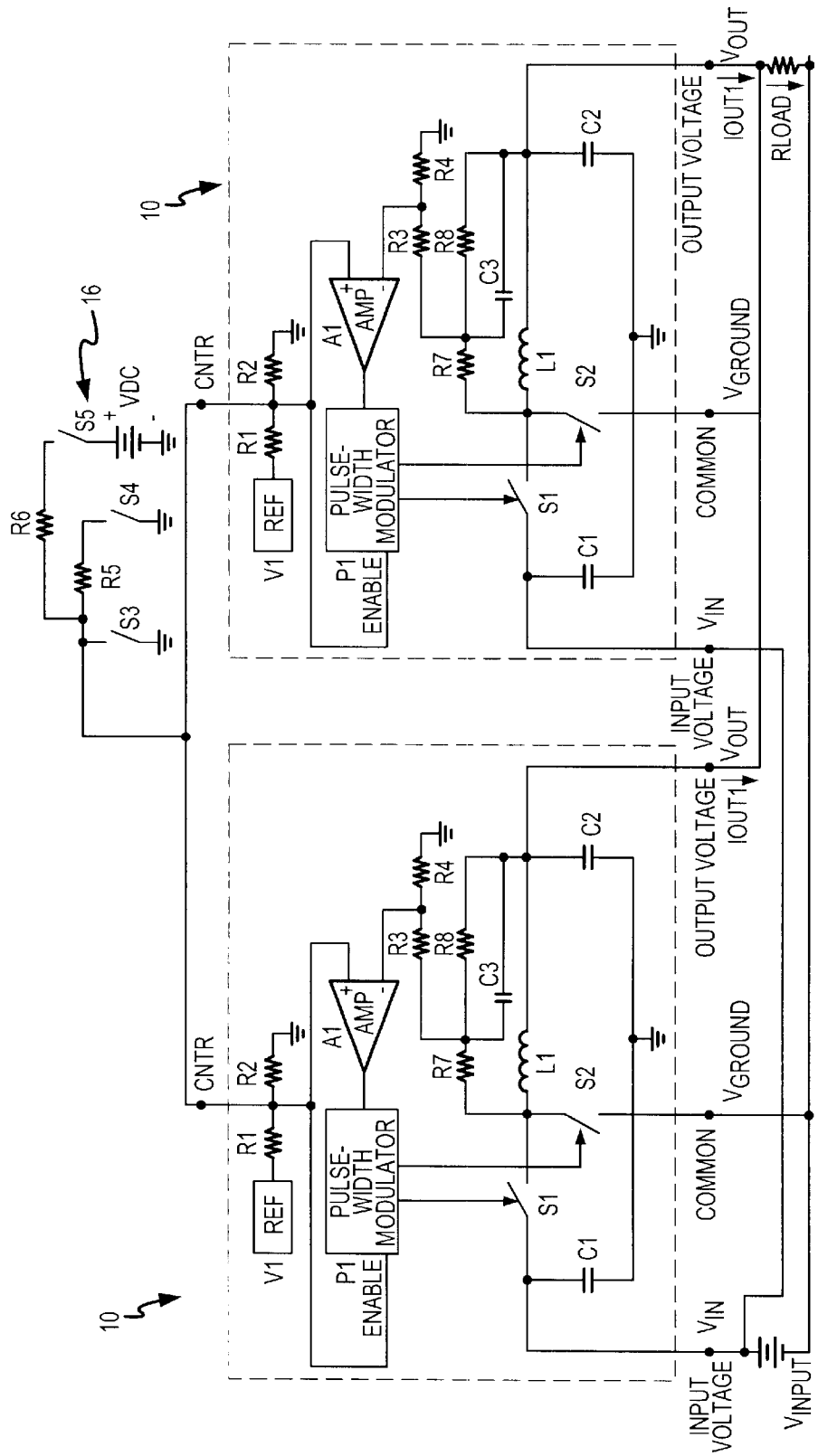
FIG. 4 is a circuit diagram of two power modules according to the present invention connected in parallel.

FIG. 4 shows two power modules 10, of the type described in FIG. 3, connected in parallel between input voltage $V_{input}$ and a load shown by resistor $R_{load}$.

Parallel power modules 10 are also shown connected to external circuitry 16 described with reference to FIG. 2. Power modules 10 are connected across input voltage $V_{input}$ by input voltage pin $V_{in}$, and common pin $V_{ground}$, and are similarly connected across load resistor $R_{load}$ by output voltage pin $V_{out}$ and common pin $V_{ground}$. Output currents $I_{out}$ flow from each of power modules 10 and are summed to form the load current $I_{load}$. While FIG. 4 shows two power modules 10 connected in parallel, one skilled in the art will easily understand that this is for illustrative purposes only, and any number of power modules 10 could be connected in parallel without departing from the scope of the present invention as described herein. As can be seen, the load current $I_{load}$ would be equal to n times the output current $I_{out}$ of each of the power modules where n is the number of power modules connected in parallel.

Multifunction control pins CNTR from each module are tied together directly to provide improved current sharing, as will be described with reference to FIGS. 5A and B, as well as to allow one set of external circuitry 16 to control all the parallel power modules. Directly connecting the multifunction control pins CNTR of all of the parallel modules allow the modules to current share much more effectively than modules without a multifunction control pin according to the present invention.

Current sharing is normally decreased by variations in the values of the components of the modules which result in slight differences in internal signals such as the reference voltage $V_{ref}$. These differences in component values can be compensated for, to some extent, by interconnecting the multifunction control pins CNTR of power modules 10 constructed according to the present invention. Interconnecting the multifunction control pins CNTR forces power modules 10 to share the same reference voltage $V_{ref}$. Reference voltages $V_{ref}$ differ between modules because of component tolerances in and are a significant source of variation in current sharing.

Figure 5A:
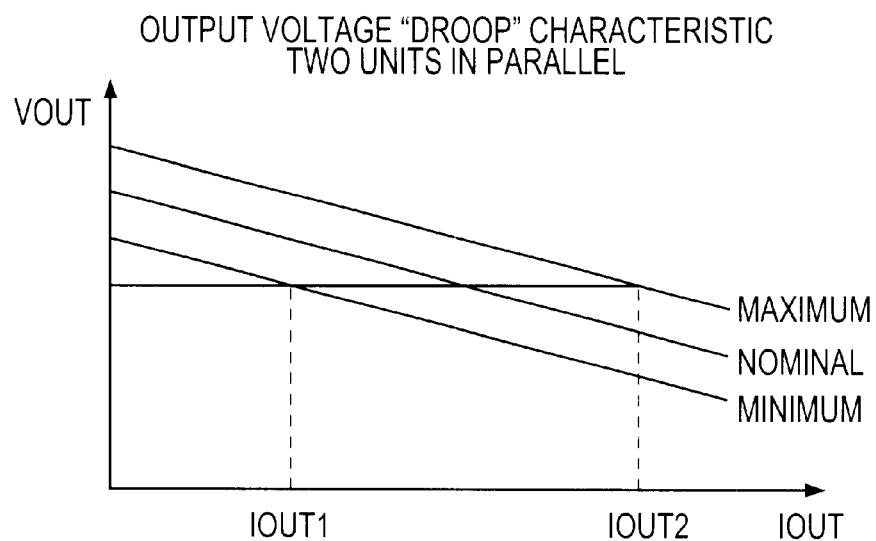
FIGS. 5A and B are graphs showing the current sharing of parallel modules without the multi-function control pins connected together and with the multi-function control pins connected together, respectively.

FIGS. 5A and B demonstrate the value of paralleling power modules according to the principles of the present invention. FIG. 5A shows the current sharing characteristics of parallel power modules exhibiting an output droop characteristic without interconnecting the multifunction control pins. The output droop characteristic described with reference to FIG. 3 can be seen where the output voltage drops as input voltage increases. FIG. 5A shows a nominal or expected value based on ideal component characteristics and values. A minimum and maximum value is also plotted which account for normal variations in component value and characteristics consistent with the expected tolerances. These three plots provide a range over which identical power modules may operate. As demonstrated in FIG. 5A, for any specific output voltage, parallel power modules operating at the minimum and maximum values will demonstrate a wide variation in current sharing.

Figure 5B:
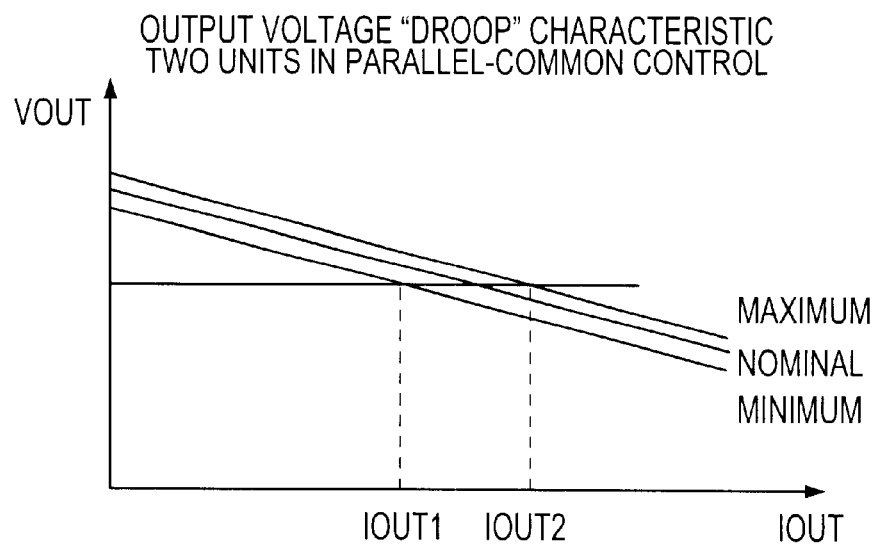

FIG. 5B shows the improved current sharing achieved with the arrangement of FIG. 4 where power modules according to the present invention are paralleled with their multifunction control pins tied together. As stated above, this causes each module to share reference voltage $V_{ref}$. As shown in FIG. 5B, this results in the range between minimum and maximum values to be narrowed significantly. Therefore, even with parallel power modules operating at the minimum and maximum values for a particular output voltage, much tighter current sharing is achieved resulting in more even wear and aging between modules.

All of the elements shown in FIGS. 1–4 are commonly available electrical components. Although particular references have been made to specific architectures and control schemes, those skilled in the art should understand that power train 13 could be formed from a multitude of switch-mode dc to dc power converter topologies, all of which are well within the broad scope of the present invention. Similarly, while controller 12 is described as a pulse width modulated controller, any suitable controller for switch-mode power converters could be used. Although the present invention has been described in detail, those skilled the art should understand that they can make various changes, substitutions and alterations herein without departing from the spirit and scope of the invention in its broadest form.

We claim:

1. A board mountable power supply module for converting an input voltage to a regulated output voltage comprising:
   a power train including an input voltage pin, an output voltage pin, and a common pin, the power train operable to convert the input voltage received on the input voltage pin into the regulated output voltage which is placed on the output voltage pin; and
   a controller connected to the power train and operable to regulate the output voltage, the controller further comprising a multifunction control pin and an integrator network, the integrator imparting an output voltage droop characteristic to the power supply module, wherein the integrator circuit improves current sharing when the board mountable power supply module is used in parallel with at least a second board mountable power module and the multi-function control pins of each module are electrically connected together.

2. The board mountable power supply module of claim 1 wherein the multi-function control pin allows the output voltage to be adjusted and allows the board mountable power supply module to be disabled.

3. The board mountable power supply module of claim 1 wherein the multi-function control pin is connected to an external circuit outside the board mountable power supply module, the external circuit operable to adjust a reference voltage within the controller thereby adjusting the regulated output voltage.

4. The board mountable power supply module of claim 3 wherein the controller includes a reference voltage used to regulate the output voltage and wherein the multifunction control pin is connected to the reference voltage.

5. The board mountable power supply module of claim 1 wherein the power train is a switch-mode, dc to dc power converter topology and the controller is a pulse width modulated controller.

6. The board mountable power supply module of claim 5 wherein the switch-mode, dc to dc power converter topology is a buck-type converter.

7. A power supply for supplying a regulated dc voltage to a load from an input voltage, the power supply comprising:
- at least two board mountable power supply modules, each module further comprising:
  - a power train operable to convert the input voltage into the regulated output voltage; and
  - a controller operable to control the operation of the power train and including a
- multifunction control pin connected to external circuitry and operable to trim the output voltage and to disable the power supply;
- wherein each module is connected in parallel between the input voltage and the regulated output voltage to supply current to the load and wherein current sharing between the modules is improved by electrically connecting the multifunction control pins of each of the modules.

8. The power supply of claim 7, each module further comprising an input voltage pin, an output voltage pin and a common pin all connected to the power train.

9. The power supply of claim 7 wherein each controller includes a reference voltage used to regulate the output voltage and wherein each multifunction control pin is connected to the reference voltage.

10. The power supply of claim 7 wherein the power train of each module is a switch-mode, dc to dc converter and the controller is a pulse width modulated controller.

11. The power supply of claim 7 wherein the controller of each module includes an integrator network, the integrator network used to impart an output voltage droop characteristic to the regulated output voltage.

* * * * *